United States Patent [19]

Dotson, Jr. et al.

[11] 3,923,734

[45] *Dec. 2, 1975

[54] FLAME-RETARDANT COMPOSITIONS

[75] Inventors: Anderson O. Dotson, Jr., Somerset; Jack Newcombe; Lionel T. Wolford, both of Freehold, all of N.J.

[73] Assignee: Cities Service Oil Company, Tulsa, Okla.

[ * ] Notice: The portion of the term of this patent subsequent to Jan. 15, 1991, has been disclaimed.

[22] Filed: May 11, 1973

[21] Appl. No.: 359,282

Related U.S. Application Data

[63] Continuation-in-part of Ser. No. 200,615, Nov. 19, 1971, abandoned.

[52] U.S. Cl... 260/45.75 B; 260/45.8 N; 260/45.8 NZ
[51] Int. Cl.$^2$.... C08K 3/22; C08K 5/34; C08K 5/35
[58] Field of Search......... 260/45.8 N, 326 C, 346.6

[56] References Cited
UNITED STATES PATENTS

| | | |
|---|---|---|
| 1,944,731 | 1/1934 | Diels et al. ................... 260/346.6 |
| 2,028,715 | 1/1936 | Hanson ........................... 252/8.1 |
| 2,576,080 | 11/1951 | Tischler et al. ................ 260/346.6 |
| 3,455,950 | 7/1969 | Cyba et al. ..................... 260/326 |
| 3,624,024 | 11/1971 | Caldwell et al. ................ 260/40 |
| 3,734,758 | 5/1973 | Cyba et al. ..................... 106/193 |
| 3,748,340 | 7/1973 | Hayes ............................. 260/326 |
| 3,786,023 | 1/1974 | Dotson, Jr. et al. ........... 260/45.75 |

OTHER PUBLICATIONS
Bartlett et al., J.A.C.S., Vol. 68, 1946, pp. 6 and 7.

Noller, "Chemistry of Organic Compounds", 3rd edition, 1965, pp. 93–95.

*Primary Examiner*—Melvin I. Marquis
*Assistant Examiner*—R. A. White
*Attorney, Agent, or Firm*—Patricia J. Hogan

[57] ABSTRACT

Normally flammable organic polymers are rendered flame-retardant by the incorporation of compounds corresponding to the formula:

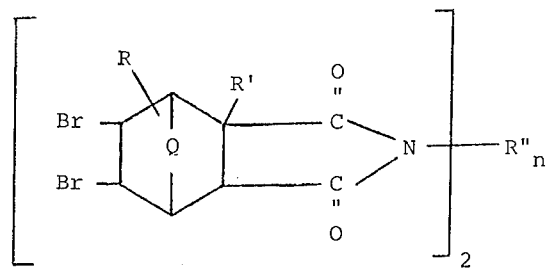

wherein Q is methylene or oxygen, R is hydrogen or an alkyl group containing 1–5 carbons, R' is hydrogen or methyl, R" is an organic group containing 1–15 carbons, and n is 0 or 1.

9 Claims, No Drawings

FLAME-RETARDANT COMPOSITIONS

CROSS-REFERENCE TO RELATED APPLICATION

This application is a continuation-in-part of copending application Ser. No. 200,615, filed Nov. 19, 1971, now abandoned.

BACKGROUND OF THE INVENTION

1. Field of the Invention

This invention relates to flame-retardant organic polymer compositions and more particularly relates to such compositions containing a novel halogenated organic flame retardant.

2. Description of the Prior Art

It is known that halogenated compounds are sometimes useful for imparting flame retardancy to normally flammable organic polymers. However, the halogenated compounds which have been proposed for use as flame retardants usually have one or more of the following disadvantages: volatility, toxicity, instability toward decomposition and/or discoloration at processing temperatures, incompatibility, and inefficiency.

Since some of these disadvantages make a compound less than desirable for use as a flame retardant, and others actually prevent it from having any practical utility as a flame retardant, it is apparent that there is a need for a flame retardant which is substantially non-volatile, non-toxic, stable at processing temperatures, compatible, and efficient.

It is believed that the general lack of success of the prior art in producing such a flame retardant is at least partially due to the tendency of a given factor to degrade at least one of these properties while improving another. For instance, it has been found that compounds containing (cyclo)aliphatic bromine are sometimes more efficient than other halogenated compounds, but these compounds have poor stability at processing temperatures and frequently have other disadvantages, such as volatility, toxicity, and incompatibility. Compounds containing vinylic bromine, e.g. vinyl bromide and bromobenzene, are usually more stable but less efficient than the corresponding saturated bromohydrocarbons, and they may also be too volatile, toxic, and incompatible.

SUMMARY OF THE INVENTION

An object of this invention is to provide novel flame-retardant organic polymer compositions.

Another object is to provide such compositions containing halogenated organic flame retardants which avoid the aforementioned disadvantages of many of the known halogenated flame retardants.

These and other objects are attained by intimately mixing a normally flammable organic polymer with a compound corresponding to the formula:

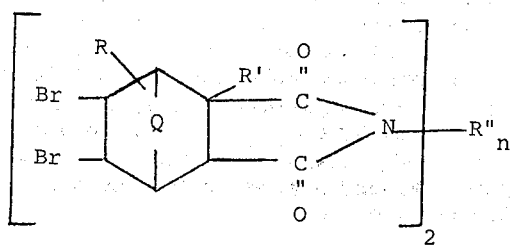

wherein Q is methylene or oxygen, R is hydrogen or an alkyl group containing 1–5 carbons, R' is hydrogen or methyl, R'' is an organic group containing 1–15 carbons, and $n$ is 0 or 1; said compound having a bromine content of at least about 35% by weight.

DESCRIPTION OF THE PREFERRED EMBODIMENTS

The flame retardant of the invention may be any bisimide of the above formula wherein the bromine content satisfies the minimum requirement, although it is preferred that the bromine content be at least about 40% by weight, advantageously at least about 45% by weight. Usually the bisimides have bromine contents in the range of about 40–60% by weight.

As indicated above, the natures of Q, R, and R' of the formula are quite restricted, but there is no criticality regarding the nature of R'' other than that, when present, it be an organic group containing 1–15 carbons, preferably 1–12 carbons, which, in any given instance, does not contain too high a percentage of non-bromine elements to reduce the bromine content of the compound below about 35% by weight. Thus, e.g., R'' may be a straight-chain or branched, saturated or unsaturated, halogenated or unhalogenated (cyclo)aliphatic hydrocarbon group of 1–15 carbons, such as methylene, ethylene, vinylene, 1,2-dibromoethylene, propylene, 2,3-dibromobutylene, cyclohexylene, bromocyclohexylene, 2,3-dibromocyclohexylene, cyclohexenylene, dodecylene, 4,4'-methylenedicyclohexylene, etc.; a halogenated or unhalogenated aromatic hydrocarbon group of 1–15 carbons, such as phenylene, bromophenylene, toluylene, bromotoluylene, xylylene, bromoxylylene, etc.; a (cyclo)aliphatic or aromatic keto group of 1–15 carbons such as

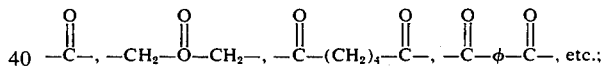

a (cyclo)aliphatic or aromatic ether group of 2–15 carbons, such as —CH$_2$—O—CH2—, —CH$_2$—CH$_2$—O—CH$_2$CH$_2$—, —O—O—O—, etc.; and other groups, such as aminotriazinylene,

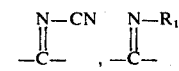

($R_1$ being hydrogen or a (cyclo)aliphatic or aromatic hydrocarbon group of 1–6 carbons),

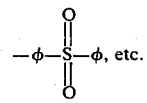

When R'' is a halogenated organic group, the halogen or halogens are usually bromine and/or chlorine.

The flame retardant of the invention may be any compound of the specified formula characterized by any combination of Q, R, R', R'', and $n$. The compounds and method of preparing them are disclosed and claimed in copending application Ser. No. 359,283, filed of even date herewith in the names of Lionel T. Wolford, Jack Newcombe, and Anderson O.

Dotson, Jr., the teachings of which are incorporated herein by reference.

The normally flammable organic polymer which is rendered flame-retardant in accordance with the invention may be natural or synthetic but is preferably a solid synthetic polymer, more preferably a polymer of an unsaturated hydrocarbon. Exemplary of the polymers are cotton, wool, silk, paper, natural rubber, wood, paint, the high molecular weight homopolymers and copolymers of unsaturated aliphatic and aromatic hydrocarbons (e.g., ethylene, propylene, styrene, etc.), acrylic polymers (e.g., polyacrylonitrile, polymethyl methacrylate, etc.), alkyd resins, cellulose derivatives (e.g., cellulose acetate, methyl cellulose, etc.), epoxy resins, furan resins, isocyanate resins (e.g., polyurethanes), melamine resins, vinyl resins (e.g., polyvinyl acetate, polyvinyl chloride, etc.), polyamide resins (e.g., Nylon 6, Nylon 66, etc.), resorcinol resins, synthetic rubbers (e.g., polyisoprene, polybutadiene, butadiene-acrylonitrile copolymers, butadiene-styrene copolymers, butyl rubber, neoprene rubber, etc.), ABS resins, and mixtures thereof. According to a preferred embodiment of the invention, the normally flammable organic polymer is polypropylene, polyethylene, polystyrene, an impact polystyrene (i.e., a rubber-modified polystyrene), or an ABS resin (i.e., a diene rubber-modified monovinylidene aromatic compound-unsaturated nitrile interpolymer.

Since the flame retardants of the invention are unusually efficient, they are normally used at low concentrations, e.g., about 2–25%, preferably about 3–20%, based on the weight of the composition. To reduce the amount of flame retardant required to achieve a desired level of flame retardancy, it is frequently desirable to employ a synergist for the flame retardant, e.g., a free radicalgenerating compound such as dicumyl peroxide, a conventional metal compound synergist, or an aliphatic or cycloaliphatic phosphite or thiophosphite containing not more than one aromatic group per phosphorus atom, e.g., distearyl pentaerythritol diphosphite.

Ordinarily the synergist, when employed, is any of the metal compounds conventionally used as synergists for halogenated flame retardants. Thus, it may be an organometallic compound but is usually an oxide or sulfide of a polyvalent metal such as antimony, arsenic, bismuth, tin, or titanium. Of such compounds, antimony trioxide is preferred. This type of synergist is normally employed in a concentration of about 20–100%, preferably about 50%, based on the weight of the flame retardant.

The flame-retardant compositions of the invention are prepared by intimately mixing the normally flammable organic polymer with the flame retardant and optionally also with other additives, such as synergists, fillers, pigments, plasticizers, stabilizers, and antioxidants, in any suitable manner. For example, the ingredients may be mixed on a two-roll mill or in an extruder or Banbury mixer.

The invention is advantageous in that the flame retardants of the invention are substantially non-volatile, non-toxic, stable toward decomposition and/or discoloration at processing temperatures, compatible with the polymers, and efficient. It is believed that their unusually good balance of stability and efficiency is probably attributable to the positioning of the bromines on saturated cycloaliphatic carbons which are alpha to bridge carbons. In any case, they have these advantages and the additional advantage that they are not easily leached from polypropylene carpets and the like by washing or dry cleaning.

The following examples are given to illustrate the invention and are not intended as a limitation thereof. Unless otherwise specified, quantities mentioned are quantities by weight.

EXAMPLE I

Blend 92.5 parts of polypropylene with 5 parts of N,N'-bis(5,6-dibromonorbornane-2,3-dicarboximide) and 2.5 parts of antimony trioxide. Mold the composition into test specimens and test for oxygen index in accordance with ASTM procedure D-2863. The composition has an oxygen index of 26.9.

EXAMPLE II

Repeat Example 1 except for preparing the composition from 92.5 parts of polypropylene, 5 parts of N,N'-(1,2-ethane)-bis(5,6-dibromonorbornane-2,3-dicarboximide), and 2.5 parts of antimony trioxide. The composition has an oxygen index of 26.9.

EXAMPLE III

Repeat Example I except for preparing the composition from 87 parts of polypropylene, 8.75 parts of N,N'-[1,4-(2,3-dibromobutyl)]-bis(5,6-dibromonorbornane-2,3-dicarboximide), and 4.25 parts of antimony trioxide. The composition has an oxygen index of 26.9.

EXAMPLE IV

Repeat Example I except for preparing the composition from 94 parts of polypropylene, 4 parts of N,N'-(1,3-propane)-bis(5,6-dibromonorbornane-2,3-dicarboximide), and 2 parts of antimony trioxide. The composition has an oxygen index of 27.5.

EXAMPLE V

Repeat Example I except for preparing the composition from 94 parts of polypropylene, 4 parts of N,N'-(1,2-propane)-bis(5,6-dibromonorbornane-2,3-dicarboximide), and 2 parts of antimony trioxide. The composition has an oxygen index of 27.5.

EXAMPLE VI

Repeat Example I except for preparing the composition from 73 parts of ABS, 18 parts of N,N'-(1,2-ethane)-bis(5,6-dibromonorbornane-2,3-dicarboximide), and 9 parts of antimony trioxide. The composition has an oxygen index of 28.1.

EXAMPLE VII

Repeat Example I except for using polyethylene, polystyrene, or impact polystyrene as the normally flammable polymer, N,N'-(1,2-ethane)-bis(1,4-endoxo-5,6-dibromocyclohexane-2,3-dicarboximide) as the flame retardant, or distearyl pentaerythritol diphosphite or dicumyl peroxide as the synergist, and/or eliminating the synergist while increasing the concentration of flame retardant. Similar results are observed.

Similar results are also observed when the materials of the Examples are replaced by other materials indicated to be their equivalents in the specification.

It is obvious that many variations may be made in the products and processes set forth above without departing from the spirit and scope of this invention.

What is claimed is:

1. A composition comprising (A) a normally flammable organic polymer, (B) antimony trioxide, and (C) a flame retardant having a bromine content of at least about 35% and corresponding to the formula:

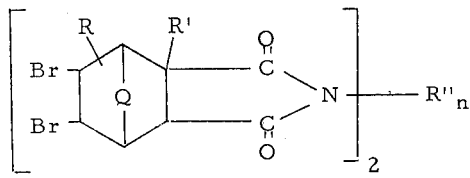

wherein Q is methylene or oxygen, R is hydrogen or an alkyl group containing 1–5 carbon atoms, R' is hydrogen or methyl, R" is a halogenated or unhalogenated (cyclo)aliphatic or aromatic hydrocarbon group of 1–15 carbon atoms, and $n$ is 0 or 1.

2. A composition comprising (A) a normally flammable organic polymer, (B) antimony trioxide, and (C) a flame retardant having a bromine content of at least about 35% and corresponding to the formula:

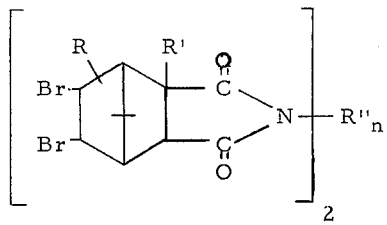

wherein R is hydrogen or an alkyl group containing 1–5 carbons; R' is hydrogen or methyl; R" is a halogenated or unhalogenated (cyclo)aliphatic or aromatic hydrocarbon group of 1–15 carbons, and $n$ is 0 or 1.

3. The composition of claim 2 wherein the flame retardant corresponds to the formula:

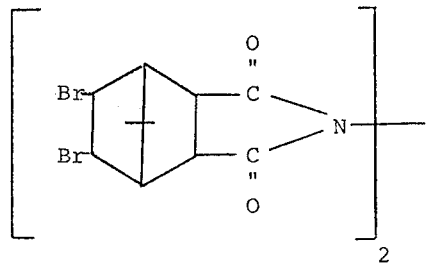

4. The composition of claim 2 wherein the flame retardant corresponds to the formula:

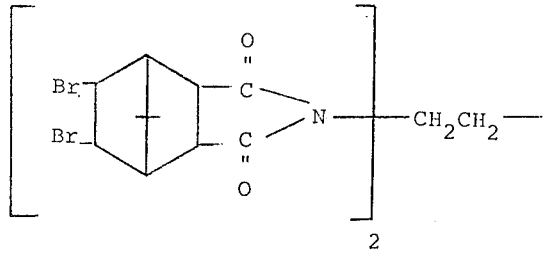

5. The composition of claim 2 wherein the flame retardant corresponds to the formula:

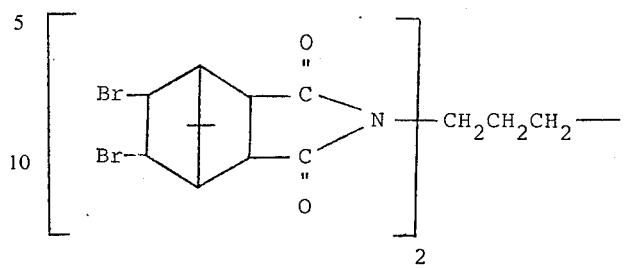

6. The composition of claim 2 wherein the flame retardant corresponds to the formula:

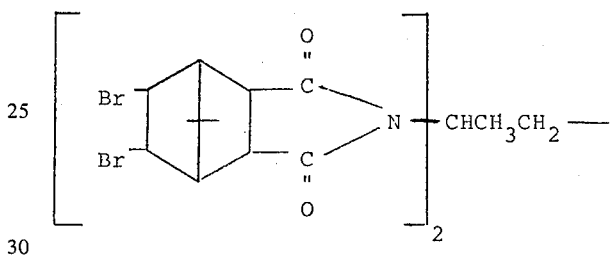

7. The composition of claim 2 wherein the flame retardant corresponds to the formula:

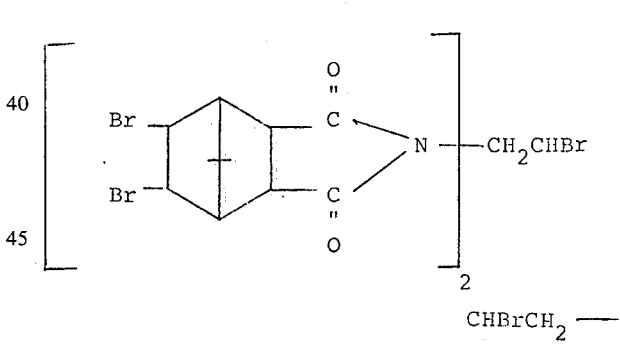

8. The composition of claim 2 wherein the normally flammable polymer is a polymer of an unsaturated hydrocarbon.

9. The composition of claim 2 wherein the normally flammable polymer is polypropylene.

* * * * *

UNITED STATES PATENT OFFICE
CERTIFICATE OF CORRECTION

Patent No. 3,923,734  Dated Dec. 2, 1975

Inventor(s) A. O. Dotson, Jr. et al.

It is certified that error appears in the above-identified patent and that said Letters Patent are hereby corrected as shown below:

On page 1, left hand column, line 5, the name of the assignee should read --Cities Service Company--. Column 2, line 43, the formula reading "-CH$_2$-O-CH2-" should read --CH$_2$-O-CH$_2$--; column 2, line 44, the formula reading "-O-O-O-" should read-- -∅-O-∅-.

Signed and Sealed this twenty-third Day of March 1976

[SEAL]

Attest:

RUTH C. MASON  
Attesting Officer

C. MARSHALL DANN  
Commissioner of Patents and Trademarks